United States Patent
Wayman et al.

(10) Patent No.: US 8,254,850 B2
(45) Date of Patent: Aug. 28, 2012

(54) COMMUNICATION MODULE COMPONENT ASSEMBLIES

(75) Inventors: Michael J. Wayman, Waconia, MN (US); Michael J. Nelson, Prior Lake, MN (US); Dean Zavadsky, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1113 days.

(21) Appl. No.: 12/137,322

(22) Filed: Jun. 11, 2008

(65) Prior Publication Data

US 2009/0311969 A1 Dec. 17, 2009

(51) Int. Cl.
- H04B 1/40 (2006.01)
- H04B 17/00 (2006.01)
- H04B 1/04 (2006.01)
- H03C 1/62 (2006.01)

(52) U.S. Cl. .................... 455/77; 455/115.2; 455/125

(58) Field of Classification Search .................... 455/77, 455/90.3, 115.1, 115.2, 120, 125, 128, 226.1, 455/226.2; 361/600, 688, 724, 728, 814
See application file for complete search history.

(56) References Cited

U.S. PATENT DOCUMENTS

| | | | |
|---|---|---|---|
| 3,987,655 A | 10/1976 | Myotte | |
| 4,308,742 A | 1/1982 | Harrison et al. | |
| 4,371,757 A | 2/1983 | Debortoli et al. | |
| 4,549,602 A | 10/1985 | Espinoza | |
| 4,742,864 A | 5/1988 | Duell et al. | |
| 4,861,077 A | 8/1989 | Welkey | |
| 5,267,762 A | 12/1993 | Gromotka | |
| 5,445,787 A | 8/1995 | Friedman et al. | |
| 5,461,542 A | 10/1995 | Kosak | |
| 5,490,408 A | 2/1996 | Ando et al. | |
| 5,710,804 A | 1/1998 | Bhame et al. | |
| 5,713,647 A | 2/1998 | Kim | |
| 5,806,948 A | 9/1998 | Rowan, Sr. et al. | |
| 5,894,407 A | 4/1999 | Aakula et al. | |
| 5,930,116 A | 7/1999 | Palmer | |
| 5,946,193 A | 8/1999 | Hendrix et al. | |
| 6,038,129 A | 3/2000 | Falaki et al. | |
| 6,065,612 A | 5/2000 | Rinderer | |
| 6,082,441 A | 7/2000 | Boehmer et al. | |
| 6,116,615 A | 9/2000 | Trehan | |

(Continued)

FOREIGN PATENT DOCUMENTS

DE 19515122 10/1996

OTHER PUBLICATIONS

Martell et al. U.S. Appl. No. 12/182,459, "Cable Protection Cover", filed Jul. 30, 2008, US.

*Primary Examiner* — Nguyen Vo
(74) *Attorney, Agent, or Firm* — Fogg & Powers LLC

(57) ABSTRACT

A communication module is provided. The module includes at least one transceiver, a filter, a power amplifier, an enclosure, an internal interface and an external interface. The power amplifier is in communication with the at least one transceiver and filter. Moreover, the at least one transceiver, filter and power amplifier are tuned and calibrated to work with each other. The enclosure is configured to physically retain the at least one transceiver, filter and power amplifier. The internal interface is configured to interface connections between the at least one transceiver and the power amplifier and the external interface configured to provided external connections to the module. In addition, the external interface is coupled to the internal interface.

22 Claims, 6 Drawing Sheets

U.S. PATENT DOCUMENTS

| | | |
|---|---|---|
| 6,142,595 A | 11/2000 | Dellapi et al. |
| 6,238,027 B1 | 5/2001 | Kohler et al. |
| 6,253,834 B1 | 7/2001 | Sterner |
| 6,280,232 B1 | 8/2001 | Beecher et al. |
| 6,310,772 B1 | 10/2001 | Hutchison et al. |
| 6,340,317 B1 | 1/2002 | Lin |
| 6,465,561 B1 | 10/2002 | Yarbrough et al. |
| 6,469,911 B1 | 10/2002 | Brown et al. |
| 6,556,443 B1 | 4/2003 | Wei |
| 6,579,029 B1 | 6/2003 | Sevde et al. |
| 6,788,535 B2 | 9/2004 | Dodgen et al. |
| 6,968,647 B2 | 11/2005 | Levesque et al. |
| 6,995,978 B2 | 2/2006 | Strauss |
| 7,027,300 B2 | 4/2006 | Lord |
| 7,032,277 B2 | 4/2006 | Rolla et al. |
| 7,068,516 B2 | 6/2006 | Chan |
| 7,116,555 B2 | 10/2006 | Kamath |
| 7,130,193 B2 | 10/2006 | Hirafuji |
| 7,177,154 B2 | 2/2007 | Lee |
| 7,225,586 B2 | 6/2007 | Levesque et al. |
| 7,245,485 B1 | 7/2007 | Morrell |
| 7,277,286 B2 | 10/2007 | Lee |
| 7,355,848 B1 | 4/2008 | Hodge et al. |
| 7,450,382 B1 | 11/2008 | Fischer et al. |
| 7,457,123 B1 | 11/2008 | Wayman |
| 7,652,880 B2 | 1/2010 | Wayman |
| 7,719,856 B2 | 5/2010 | Nelson |
| 7,724,521 B2 | 5/2010 | Nelson |
| 7,769,355 B2 * | 8/2010 | Ichitsubo et al. .......... 455/127.1 |
| 7,864,534 B2 | 1/2011 | Wayman |
| 2003/0193774 A1 | 10/2003 | Shyr |
| 2004/0112623 A1 | 6/2004 | L'Henaff et al. |
| 2004/0121132 A1 | 6/2004 | Slyne |
| 2004/0222517 A1 | 11/2004 | Robertson |
| 2005/0168941 A1 | 8/2005 | Sokol |
| 2005/0221765 A1 * | 10/2005 | Shen et al. ....................... 455/73 |
| 2006/0196640 A1 | 9/2006 | Siu |
| 2006/0223577 A1 * | 10/2006 | Ouzillou .................... 455/553.1 |
| 2006/0246276 A1 | 11/2006 | Chung |
| 2006/0279927 A1 | 12/2006 | Strohm |
| 2007/0025068 A1 | 2/2007 | Chen |
| 2007/0247809 A1 | 10/2007 | McClure |
| 2008/0043425 A1 | 2/2008 | Hebert |
| 2008/0181282 A1 | 7/2008 | Wala et al. |
| 2008/0235907 A1 | 10/2008 | Wayman et al. |
| 2008/0237420 A1 | 10/2008 | Wayman et al. |
| 2008/0238270 A1 | 10/2008 | Wayman et al. |
| 2008/0239632 A1 | 10/2008 | Wayman |
| 2008/0239669 A1 | 10/2008 | Wayman |
| 2008/0239673 A1 | 10/2008 | Wayman |
| 2008/0239688 A1 | 10/2008 | Casey et al. |
| 2008/0240164 A1 | 10/2008 | Zavadsky |
| 2008/0240225 A1 | 10/2008 | Zavadsky et al. |
| 2008/0241571 A1 | 10/2008 | Wayman et al. |
| 2008/0242232 A1 | 10/2008 | Zavadsky et al. |
| 2008/0245938 A1 | 10/2008 | Qualy et al. |
| 2008/0278912 A1 | 11/2008 | Zavadsky et al. |
| 2008/0318631 A1 | 12/2008 | Baldwin |
| 2009/0231815 A1 | 9/2009 | Kim |
| 2009/0309467 A1 | 12/2009 | Nelson |
| 2009/0310972 A1 | 12/2009 | Wayman |
| 2009/0311969 A1 | 12/2009 | Wayman |
| 2009/0311974 A1 | 12/2009 | Nelson |
| 2010/0025068 A1 | 2/2010 | Martell |

* cited by examiner

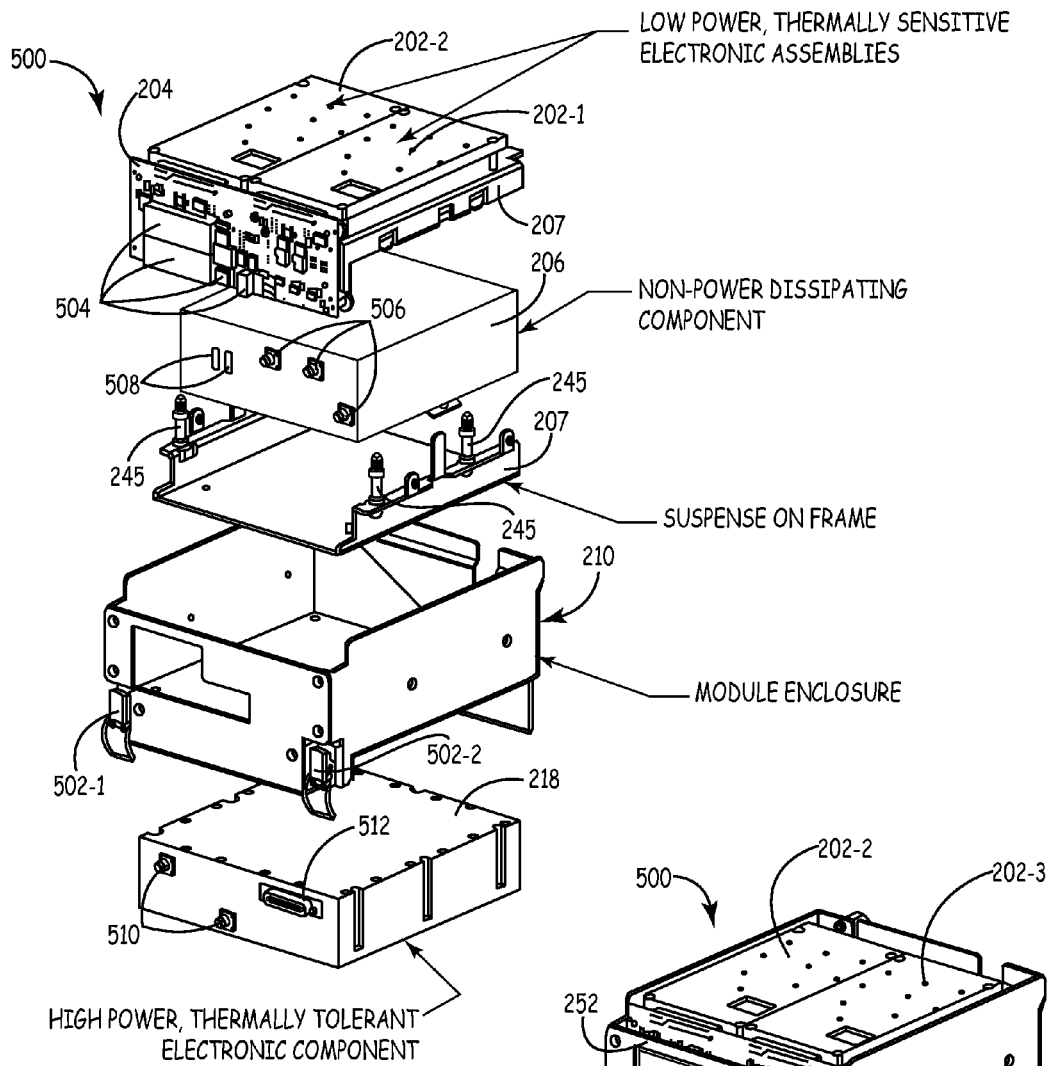
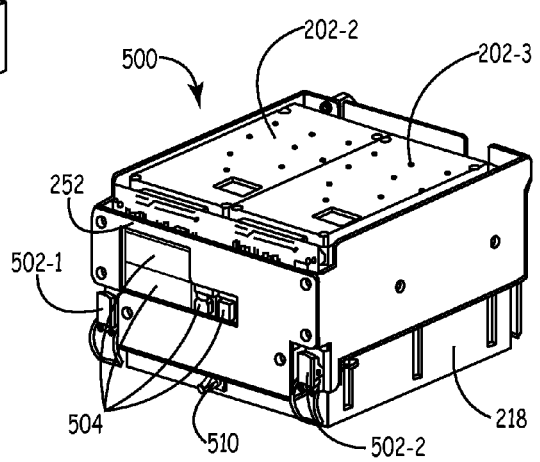
FIG. 5A
FIG. 5B

COMMUNICATION MODULE COMPONENT ASSEMBLIES

RELATED APPLICATIONS

This application is related to the following co-pending United States patent applications filed on even date herewith, all of which are hereby incorporated herein by reference:

U.S. patent application Ser. No. 12/137,297 (entitled "APPARATUS FOR MOUNTING A MODULE AND ENABLING HEAT CONDUCTION FROM THE MODULE TO THE MOUNTING SURFACE") and which is referred to here as the '1028 Application;

U.S. patent application Ser. No. 61/060,589 (entitled "COMPONENT SUSPENSION FRAME") and which is referred to here as the '1029 Application;

U.S. patent application Ser. No. 12/137,307 (entitled "ANGLED DOORS WITH A CONTINUOUS SEAL") and which is referred to here as the '1030 Application;

U.S. patent application Ser. No. 61/060,523 (entitled "L-SHAPED DOOR WITH 3-SURFACE SEAL FOR END-PLATES") and which is referred to here as the '1031 Application;

U.S. patent application Ser. No. 61/060,576 (entitled "L-SHAPED DOORS WITH TRAPEZOIDAL SEAL") and which is referred to here as the '1032 Application;

U.S. patent application Ser. No. 12/137,309 (entitled "SYSTEM AND METHOD FOR VENTURI FAN-ASSISTED COOLING") and which is referred to here as the '1033 Application;

U.S. patent application Ser. No. 61/060,547 (entitled "COMBINATION EXTRUDED AND CAST METAL OUTDOOR ELECTRONICS ENCLOSURE") and which is referred to here as the '1034 Application;

U.S. patent application Ser. No. 61/060,584 (entitled "SYSTEM AND METHODS FOR CABLE MANAGEMENT" and which is referred to here as the '1035 Application;

U.S. patent application Ser. No. 61/060,581 (entitled "CAM SHAPED HINGES") and which is referred to here as the '1037 Application;

U.S. patent application Ser. No. 12/137,313 (entitled "SOLAR SHIELDS") and which is referred to here as the '1038 Application;

U.S. patent application Ser. No. 61/060,501 (entitled "APPARATUS AND MEHTOD FOR BLIND SLOTS FOR SELF DRILLING/SELF-TAPPING SCREWS") and which is referred to here as the '1039 Application.

U.S. patent application Ser. No. 61/060,593 (entitled "SYSTEMS AND METHODS FOR THERMAL MANAGEMENT") and which is referred to here as the '1040 Application.

U.S. patent application Ser. No. 61/060,762 (entitled "SERF BOARD COMPONENTS") and which is referred to here as the '1062 Application.

U.S. patent application Ser. No. 61/060,740 (entitled "PULL-OUT SHELF FOR USE IN A CONFINED SPACE FORMED IN A STRUCTURE") and which is referred to here as the '1064 Application.

BACKGROUND

Radio frequency (RF) communication systems that receive and send signals typically include devices such as a radio transceiver, a filter and power amplifier. Each device has to be selected to work with the other devices. Moreover, each device needs to be tuned and calibrated to work with each other. Hence, putting together a working communication system that works as desired takes some effort.

For the reasons stated above and for other reasons stated below which will become apparent to those skilled in the art upon reading and understanding the present specification, there is a need in the art for an effective and efficient method of forming a communication system.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a communication module is provided. The module includes at least one transceiver, a filter, a power amplifier, an enclosure, an internal interface and an external interface. The power amplifier is in communication with the at least one transceiver and filter. Moreover, the at least one transceiver, filter and power amplifier are tuned and calibrated to work with each other. The enclosure is configured to physically retain the at least one transceiver, filter and power amplifier. The internal interface is configured to interface connections between the at least one transceiver and the power amplifier and the external interface is configured to provided external connections to the module. In addition, the external interface is coupled to the internal interface.

BRIEF DESCRIPTION OF THE DRAWINGS

The present invention can be more easily understood and further advantages and uses thereof more readily apparent, when considered in view of the detailed description and the following figures in which:

FIG. 5A is an exploded back-perspective view of a module of one embodiment of the present invention; and FIG. 5B is a back-perspective view of an assembled module of one embodiment of the present invention.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention.

The following detailed description is, therefore, not to be taken in a limiting sense, and the scope of the present invention is defined only by the claims and equivalents thereof.

Embodiments of the present invention provide an RF module with components that include at least one power amplifier, a filter and a radio transceiver. The components are tuned and calibrated so they work with each other as intended. Moreover embodiments have all components of the module built, tested and serviced as a complete finished module. This allows for easy calibration of the components by either mechanical tuning or digital calibration. Accordingly, this allows for higher individual component yield by compensating for imperfections and mix/match variations of the components in the assembled module. Moreover, in embodiments, standard test and measurement equipment under computer control completely automate the calibration process. This reduces time, decreases operator error and improves the end product yield.

In embodiments RF modules are all prewired and prepackaged and no extra hardware is needed to make the devices work with each other. In one embodiment, the module is designed for easy access to the device inputs and outputs. Moreover, in one embodiment, the power amplifier, filter and transceiver are all single frequency band components. Another advantage to embodiments of the module is that allows all of the components of the module to be assembled in the same location. Therefore, needed cable connections can be made right at the assembly location. This allows for easy service, repair or upgrade since the customer can simply insert and remove the components without having to make connections in the field.

Figure 1:
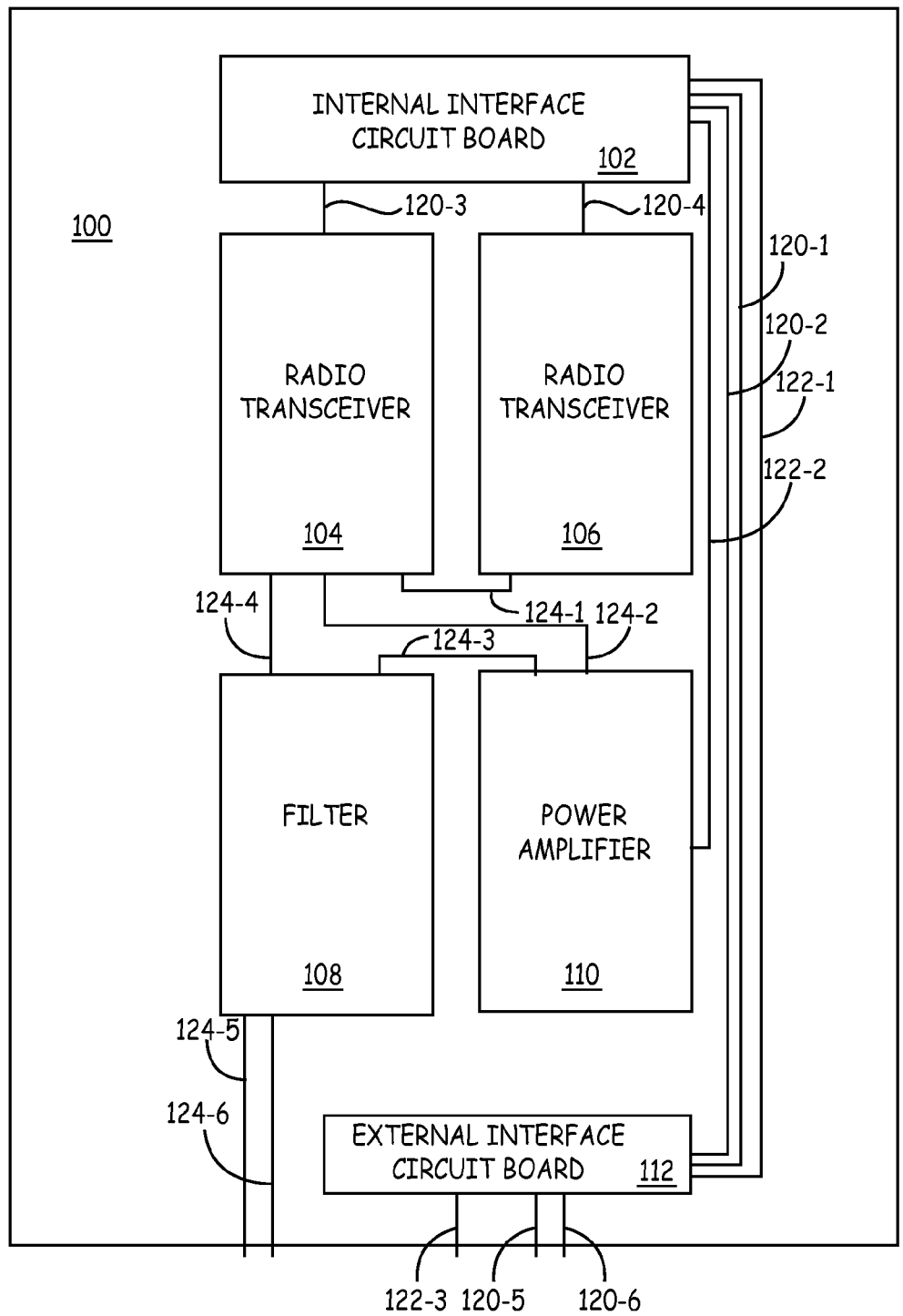
FIG. 1 is a block diagram of a communication module of one embodiment of the present invention.

Referring to FIG. 1, a block diagram of an RF module 100 of one embodiment is illustrated. As illustrated, the module 100 includes radio transceivers 104 and 106, filter 108 and power amplifier 110. Also included is an internal interface circuit board 102. The internal interface circuit board 102, interfaces connections between the devices and an external interface circuit board 112. The devices 104, 106, 108 and 110 and interfaces 102 and 112 are coupled to each other via respective data connections 120-1 through 120-6, power connections 122-1 through 122-3 and RF signal connections 124-1 through 124-6 as illustrated in FIG. 1. RF signal connections to outside the module 100 are provided by connections 124-5 and 124-6. Power to the module 100 is provided by power connection 122-3. Data signals are received from module 100 and provided to module 100 respectively by data connections 120-5 and 120-6. Although, the module 100 is illustrated as having two transceivers 104 and 106, any number of transceivers could be used, including one and the present invention is not limited to two. Moreover, the transceivers 104 and 106 are illustrated as being radio transceivers. However, the present invention is applicable to other types of transceivers and is not limited to radio transceivers.

Figure 2:
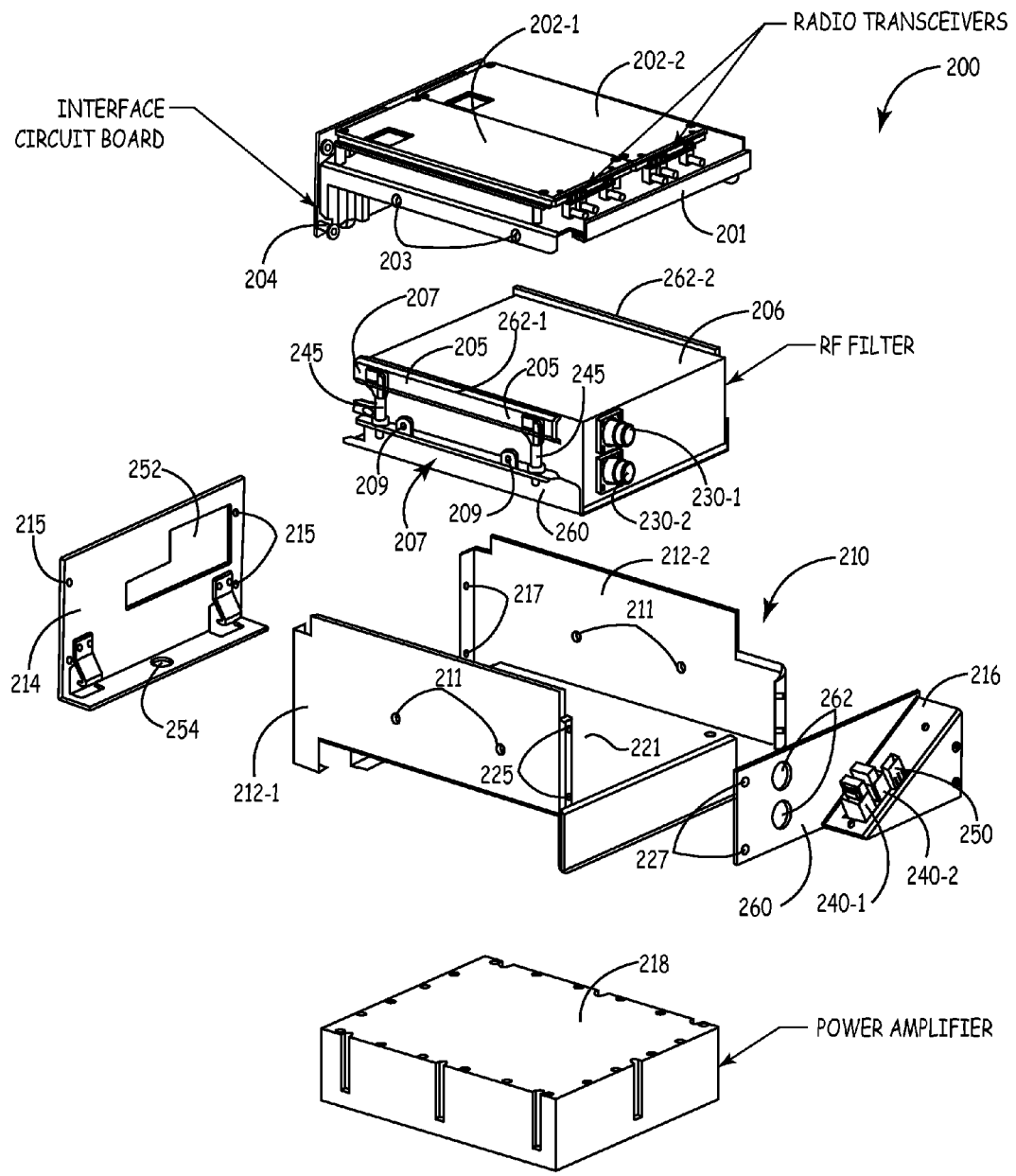
FIG. 2 is an exploded side perspective view of a communication module of one embodiment of the present invention.

FIG. 2 illustrates an exploded side perspective view of a module 200 of one embodiment of the present invention. The module 200 includes radio transceivers 202-1 and 202-2 that are mounted to a transceiver bracket 201. An internal interface circuit board 204 is also mounted to the transceiver bracket 201. The module 200 further includes an RF filter 206. A filter suspension frame 207 is coupled to the RF filter 206. The suspension frame 207 is coupled to transceiver bracket 210 with an attaching device such as, but not limited to, a screw or bolt via apertures 203 in the transceiver bracket 201 and apertures 205 in suspension frame 207. It will be understood that other apertures 201 and 205 not shown in FIG. 2 are also used to couple the transceiver bracket 210 and suspension frame 207. The suspension frame 207 includes supports 245 that hold two portions of the suspension frame 207 around the RF filter 206. In one embodiment, the supports 245 provide the only thermally conductive path between high and low power components. Further in one embodiment, the supports 245 are made from a thermally insulating material.

As illustrated, the module 200 further includes an enclosure 210. The enclosure has a pair of sidewalls 212-1 and 212-2 and a bottom plate 221. The RF filter 206 is received in the enclosure 210. In particular, the suspension frame 207 of the RF filter 206 is coupled to the side walls 212-1 and 212-2 of the enclosure 210. In the embodiment of FIG. 2, the suspension frame 207 is coupled to the sidewalls 212-1 and 212-1 with attaching devices via apertures 209 in the suspension frame 207 and apertures 211 in the sidewalls 212-1 and 212-2. In one embodiment, a space is maintained between the RF filter 206 and a first surface of the bottom plate 221 of enclosure 210 to provide thermal separation. As illustrated, a power amplifier 218 is coupled to a second surface of the bottom plate 221 of the enclosure 210. The enclosure 210 also includes a back plate 214 that is coupled to the sidewalls 212-1 and 212-2 with attaching devices via apertures 215 in the back plate 214 and apertures 217 in the sidewalls 212-1 and 212-2. The back plate 214 also includes cutout sections 252 and 254. The cutout sections 252 and 254 allow for connection cables and components to extend out of the enclosure 210.

The enclosure further includes a front plate 260 that is attached to the sidewalls 212-1 and 212-2 with attaching devices via apertures 225 in the sidewalls 212-1 and 212-2 and apertures 227 in the front plate 260. The front plate 260 includes apertures 262 that allow RF connectors 230-1 and 230-2 of the RF filter 206 to pass there through thereby allowing easy connections to the RF filter. An external interface portion 216 is coupled to the front plate 260. The external interface portion 216 includes external connections for data 240-1 and 240-2 and a power connection 250.

Figure 3:
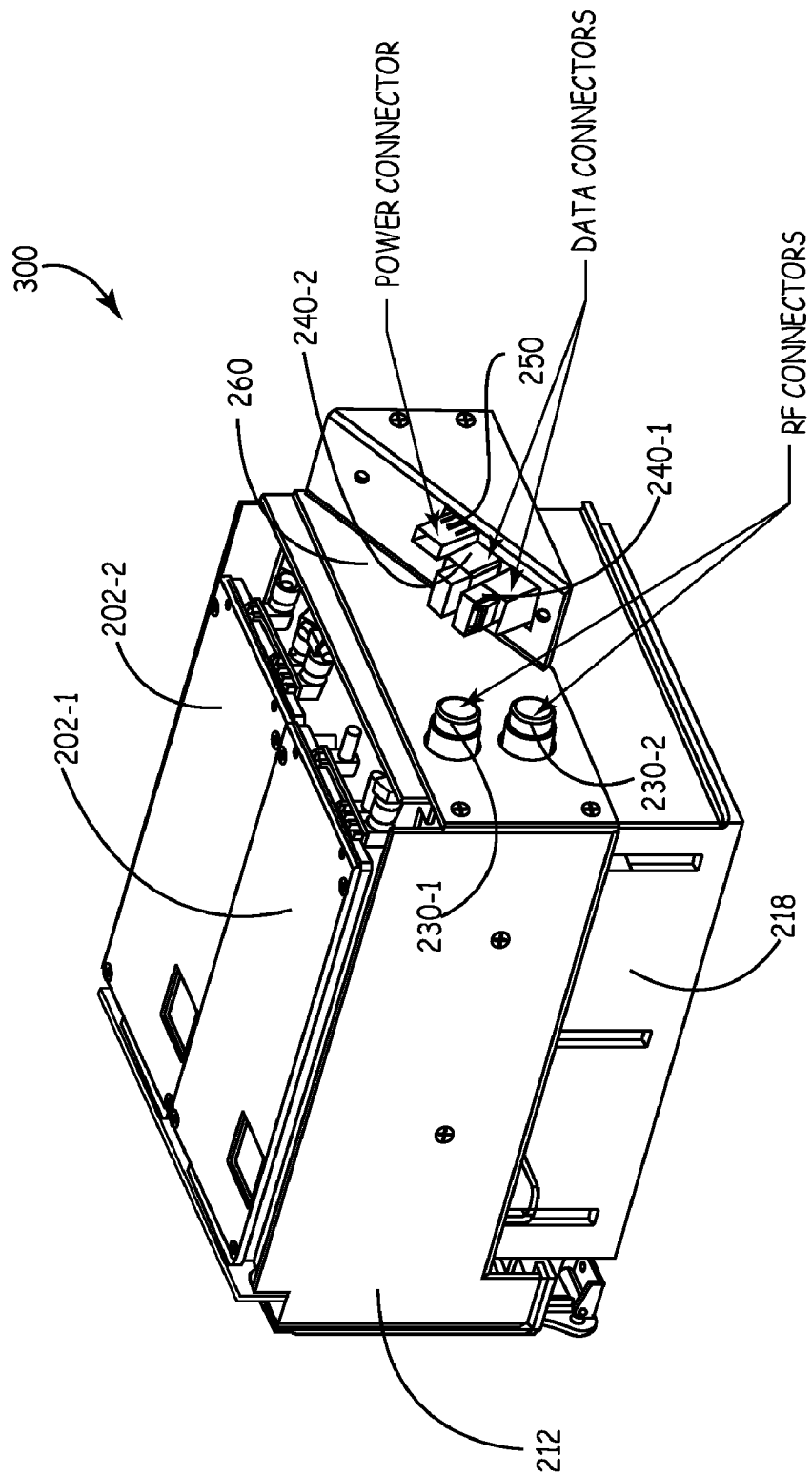
FIG. 3 is a side perspective view of a communication module of one embodiment of the present invention.
Figure 4:
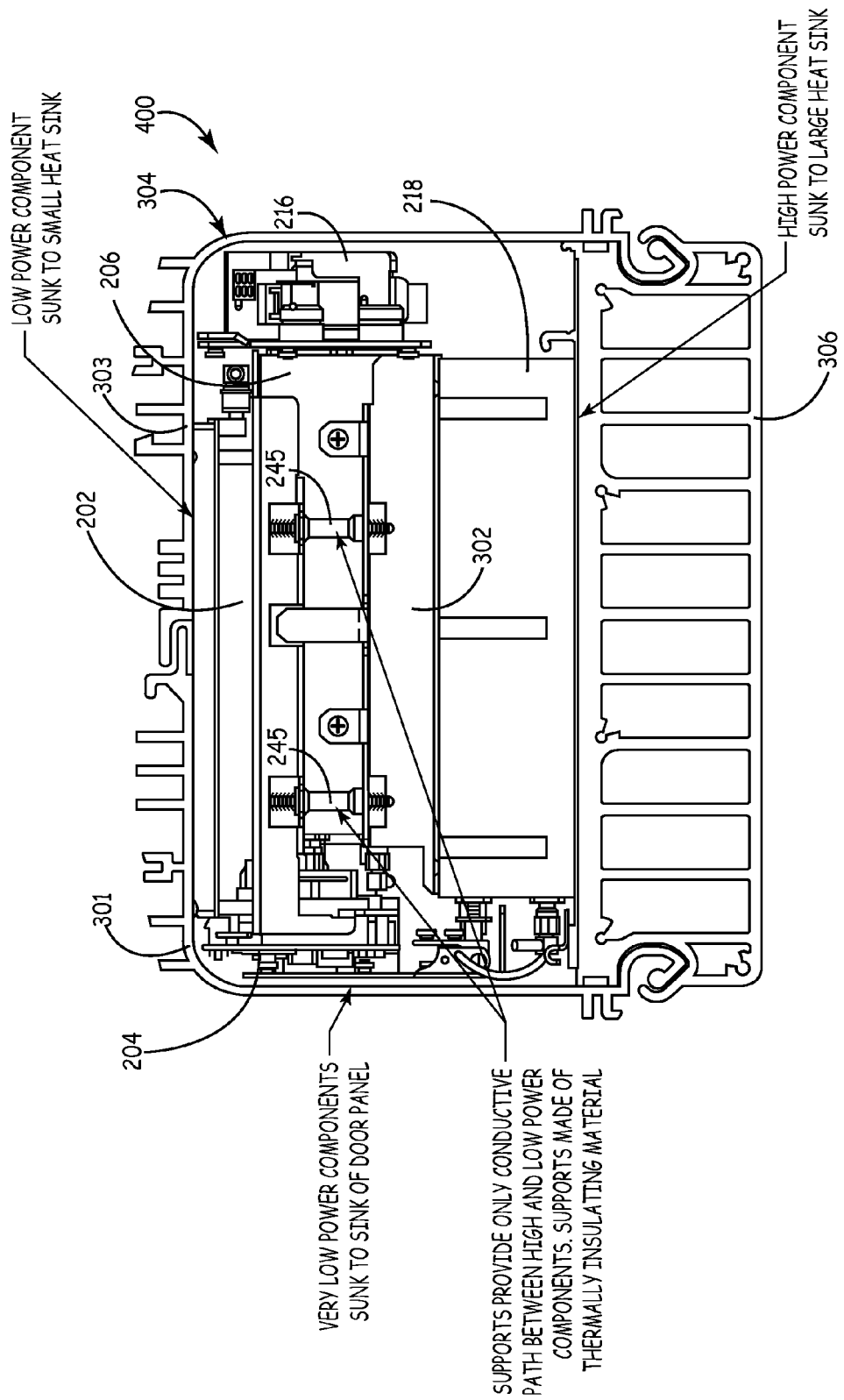
FIG. 4 is a cut out side view of a communication module of one embodiment of the present invention.

Referring to FIG. 3, a side perspective view of an assembled module 300 of an embodiment is illustrated. As illustrated, radio transceivers 202-1 and 202-2 are received in the enclosure 210. Also illustrated in FIG. 3, is the power amplifier 218 coupled to an opposite side of the enclosure 210. Further illustrated are the RF connectors 230-1 and 230-2 passing through the front plate 260 of the enclosure 210 and the data connectors 240-1 and 240-2 as well as power connector 250. As illustrated, all the external connections (interfaces) are accessible in the same general region of the module 300. This arrangement allows for easy access to the external interfaces. FIG. 4 illustrates a cut-out side view of an assembled module 400 in an enclosure 340. This view illustrates the space 302 that is formed between the RF filter 206 and the power amplifier 218. The space 302 provides a thermal buffer between the relatively low power components of the radio transceivers 202, the non-power dissipating RF filter 206 and the relatively high power amplifier 218. In addition, in one embodiment a relatively larger heat sink 306 is thermally coupled to the power amplifier 218. Further in the embodiment of FIG. 4, the relatively low power components, the transceivers 202 are thermally coupled to door panels 310 and 303 of the enclosure.

FIG. 5A illustrates an exploded back-perspective view of a module 500 of one embodiment. This view illustrates components 504 of the interface circuit 204 that fit in cut out 252 of the back plate of the enclosure 210. Also illustrated are connections 506 and 508 of the RF filter 206. The respective connections are either coupled to the internal interface circuit 204 or routed to the external interface 216 illustrated in FIG. 2. This is also true for connections 510 and 512 of the power amplifier 218. Also illustrated in FIG. 5A is retaining devices 502-1 and 502-2. The retaining elements 502-1 and 502-2 are used to retain the heat sink 306, illustrated in FIG. 3, to the power amplifier 218. Referring to FIG. 5B, a back perspective view of an assembled module 500 is illustrated. In particular, this view illustrates how the components 504 of the interface circuit board 204 fit through the cut out section 252 of the enclosure 210.

Figure 6:
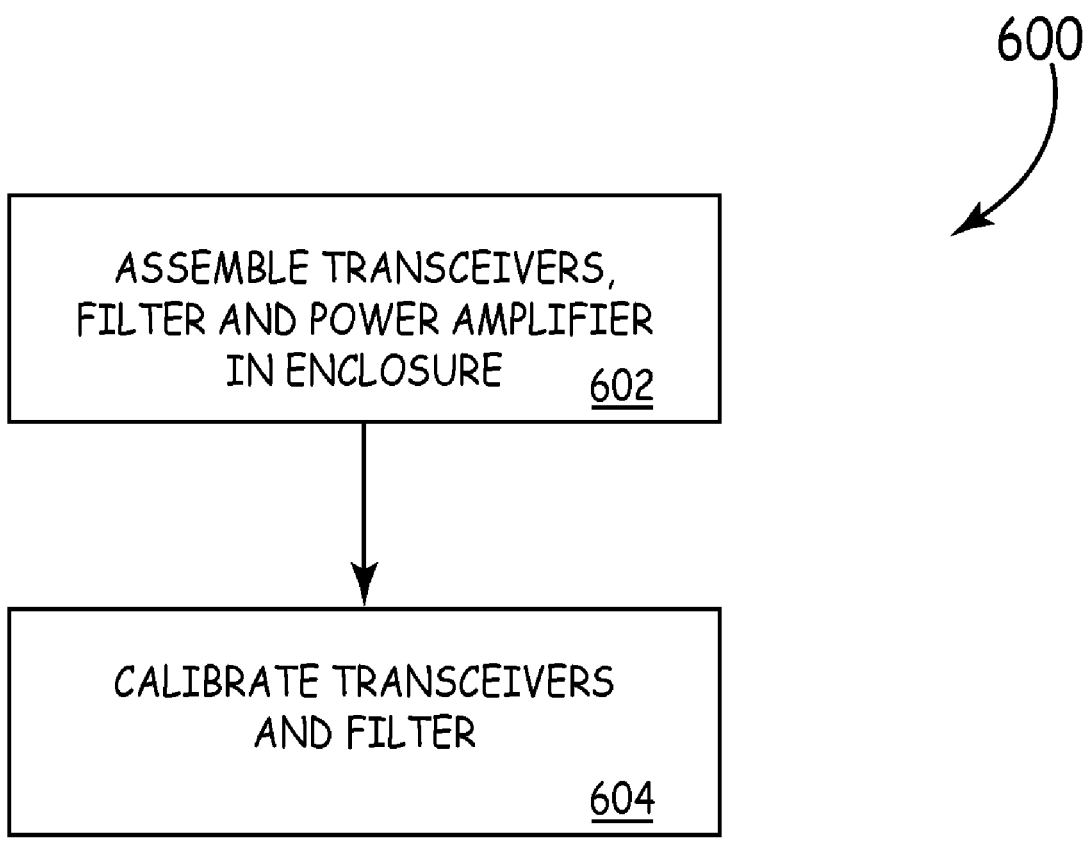
FIG. 6 is a flow chart for a method of one embodiment of the present invention.

FIG. 6 illustrated a flow diagram 600 of the formation of a module of one embodiment. In this embodiment, the transceivers, filter and the power amplifier are coupled to the enclosure (602). The transceivers and filter are then calibrated (604). The calibration of the module can be done by either mechanical tuning or digital calibration. By calibrating the module in this manner, higher individual component yield can be used because compensation for imperfections and mix/match variation of the components in the assembled module is achieved. Moreover, in one embodiment, an automated process is used to calibrate each module.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A communication module, the module comprising:
   at least one transceiver;
   a filter;
   a power amplifier in communication with the at least one transceiver and filter, wherein the at least one transceiver, filter and power amplifier are tuned and calibrated to work with each other;
   an enclosure configured to physically retain the at least one transceiver, filter and power amplifier;
   an internal interface configured to interface connections between the at least one transceiver and the power amplifier; and
   an external interface configured to provided external connections to the module, the external interface being coupled to the internal interface.

2. The module of claim 1, wherein the at least one transceiver is a radio transceiver and the filter is a radio frequency (RF) filter.

3. The module of claim 2, further comprising:
   external connections to provide RF signals from the RF filter.

4. The module of claim 2, wherein the external connections to the external interface further comprise:
   a power connection to power the module.

5. The module of claim 1, wherein the enclosure is further configured to space the power amplifier a select distance from the at least one transceiver and the filter.

6. A module comprising:
   at least one radio transceiver;
   an RF filter;
   a power amplifier in communication with the at least one transceiver and filter, the power amplifier, the at least one radio transceiver and the RF filter being tuned and calibrated to work with each other;
   a filter suspension frame configured to engage the RF filter; and
   an enclosure configured to hold the at least one radio transceiver, the RF filter and the power amplifier, the enclosure further comprising a pair of sidewalls and a bottom plate, the filter suspension frame coupled to the sidewalls such that space is created between the RF filter and a first surface of the bottom plate of the enclosure, further wherein the power amplifier is coupled to a second surface of the bottom plate of the enclosure.

7. The module of claim 6, wherein the filter suspension frame further comprises:
   a plurality of supports configured to hold the filter suspension frame around the RF filter.

8. The module of claim 7, wherein the supports are made from thermally insulating material.

9. The module of claim 6, further comprising:
   a transceiver bracket coupled to the at least one radio transceiver, the transceiver bracket further configured to be coupled to the filter suspension frame.

10. The module of claim 6, further comprising:
    an internal interface configured to provide an interface between the at least one radio transceiver and the power amplifier; and
    and an external interface configured to provide an external interface to the module, the external in communications with the internal interface.

11. The module of claim 10, wherein the internal interface is coupled to a transceiver bracket that is configured to be coupled to the filter suspension frame.

12. The module of claim 10, wherein the enclosure further comprises a front plate that is configured to be coupled to the sidewalls, the external interface being coupled to the front plate.

13. The module of claim 12, wherein the front plate has at least two apertures that allow RF connections of the RF filter to pass there through.

14. The module of claim 10, wherein the enclosure further comprises a back plate that is configured to be coupled to the sidewalls.

15. The module of claim 14, wherein the back plate includes at least one cut out section that allows components on the internal interface to pass there through.

16. The module of claim 6, wherein the at least one radio transceiver, RF filter and power amplifier are single frequency band components.

17. A communication module mounting system, the module mounting system comprising:
    a transceiver bracket configured to hold at least one transceiver;
    a filter suspension frame configured to retain a filter, the filter suspension frame further configured to be coupled to the transceiver bracket; and
    an enclosure, the enclosure including,
       a pair of sidewalls, the sidewalls configured to couple the filter suspension frame there between,
       a bottom plate coupled between the pair of sidewalls,
       a front plate also coupled between the pair of sidewalls, and
       a back plate further coupled between the pair of side walls at an opposite end of the sidewalls than where the front plate is coupled thereto.

18. The module mounting system of claim 17, wherein the filter suspension frame has a first portion and a second portion coupled to hold the filter via plurality of thermally insulting supports.

19. The module mounting system of claim 17, wherein the transceiver bracket is further configured to be coupled to an internal interface circuit board that provides internal connections to components mounted to the module mounting system.

20. The module mounting system of claim 17, further comprising an external interface circuit board coupled to the front plate of the enclosure, the external interface circuit board configured to provide external connections to components mounted to the module mounting system.

21. The module mounting system of claim 17, wherein a space is formed between a filter in the filter suspension frame and a first side of the bottom plate, a second side of the bottom plate configured to abut a power amplifier.

22. The module mounting system of claim 21, further comprising;
   at least one retaining element coupled to the enclosure configured to retain a heat sink against the power amplifier.

* * * * *